Oct. 28, 1941. J. SCHUCK ET AL 2,260,584
BABY HAMMOCK
Filed Aug. 22, 1939
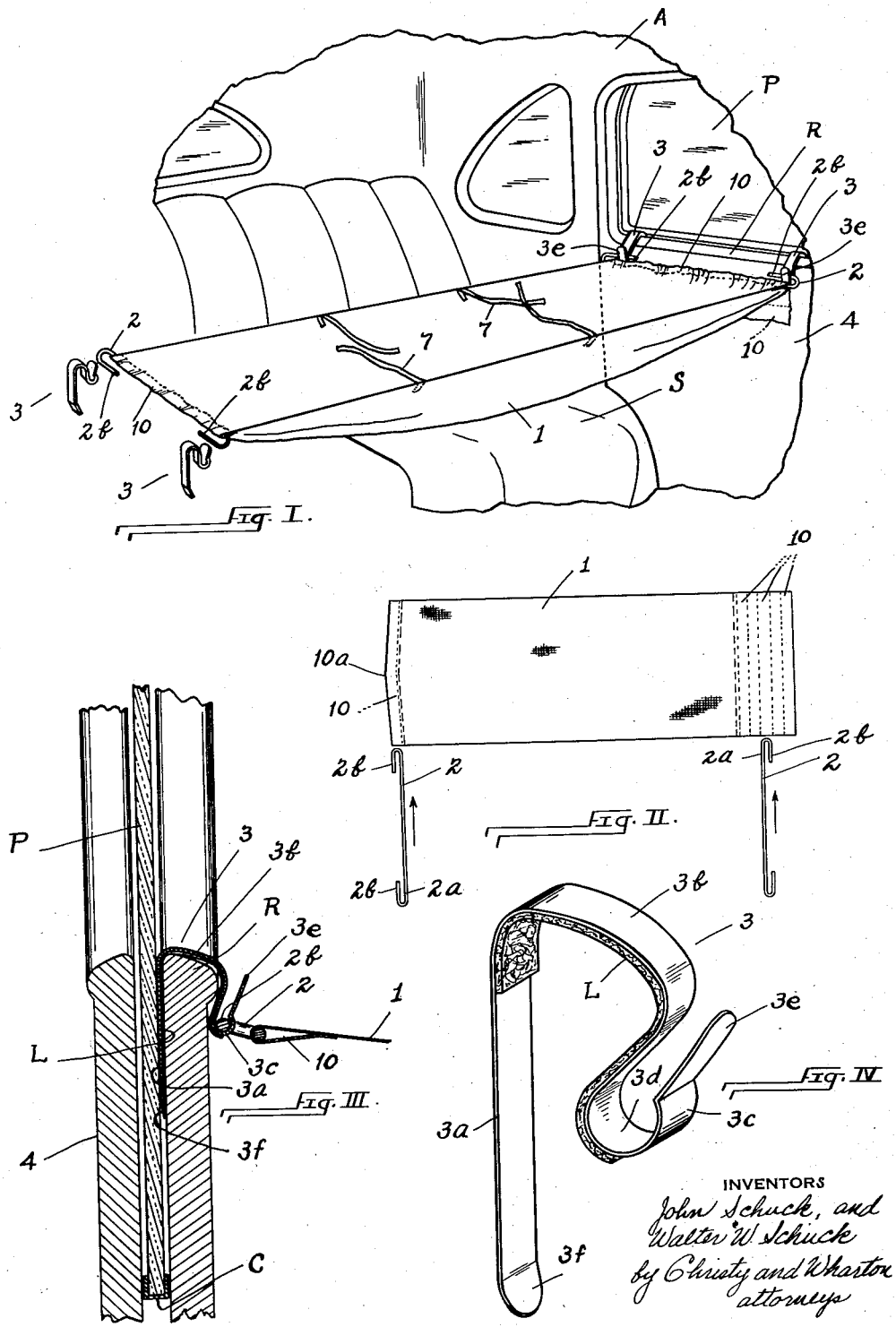
INVENTORS
John Schuck, and
Walter W. Schuck
by Christy and Wharton
attorneys Patented Oct. 28, 1941

2,260,584

UNITED STATES PATENT OFFICE 2,260,584

BABY HAMMOCK

John Schuck and Walter W. Schuck, Struthers, Ohio, assignors to Frank M. Hoover, Inc., a corporation of Ohio Application August 22, 1939, Serial No. 291,353

4 Claims. (Cl. 5—94)

Our invention relates to hammocks, particularly to a child's hammock that may be suspended between the opposite side walls of a vehicle. The invention consists in structural refinements, and more particularly in the means for anchoring the two ends of the hammock to the side walls of the vehicle.

In general our hammock consists in a substantially rectangular sheet of canvas, or other suitable flexible material. The rectangular sheet is hemmed at its two ends, and through each hemmed end a rod is threaded, in this case a rigid rod. In service the rods at the two ends of the hammock are anchored to the opposite side walls of an automobile, with the canvas body suspended between. As so suspended, the structure provides a safe and comfortable couch or bed in which a child may rest.

As above mentioned, the invention is particularly, though not exclusively, concerned with the means for anchoring the hammock to the walls of the car. Such means consist in four clips, one for each of the four corners of the hammock. Each clip consists in a strap or spring steel of shepherd's crook shape, including a straight stem, a curved head, and a reversely curved tip. The clip is adapted to engage between its stem and curved head the rim of a vehicle side wall, and the reversely curved tip is adapted to engage and anchor one corner of the hammock. More specifically, the hammock-supporting rods extend from the ends of the hems in the rectangular sheet of canvas, and provide at the four corners of the hammock exposed rod portions that are immediately engaged in the hook-shaped tips of the four anchors or clips.

It is to be noted that the clips are particularly adapted for installation upon the rims or sills of the windows in the opposite side walls or doors of the modern automobile; that is to say, the rims of the automobile walls that the clips engage consist, in fact, in the sills of the windows in such walls or doors. Two of the clips are secured in spaced-apart relation upon the sill of the window in each of the opposite side walls or doors of the car, and the hammock is at its four corners secured in the four clips. As so installed, the straight leg portion of each clip extends downward between window sill and the pane of glass that in a known way is vertically adjustable in the wall or door. Characteristically, the installed clips offer no interference to normal window adjustment.

In the accompanying drawing Fig. I is a fragmentary view of the interior of an automobile of sedan type, illustrating in perspective a hammock of the invention in position of service. One end of the hammock is shown anchored to the door on one side of the car, while on the opposite side of the car the anchoring clips, with the corresponding door of the car omitted for clarity of illustration, are shown in proper position, ready to engage the rod at the opposite end of the hammock. Fig. II is a view in plan and to smaller scale of the fabric body of the hammock, with the two supporting rods of the hammock structure in position to be assembled in the hems in such body. Fig. III is a fragmentary view, showing one of the windowed doors of the automobile in vertical section and to larger scale, and illustrating one of the hammock-anchoring clips of the invention assembled upon the sill of the window, with one of the hammock-supporting rods engaged thereby. And Fig. IV is a view in perspective, and to still larger scale, of one of such hammock-anchoring clips.

Referring to the drawing, the reference numeral 1 is applied to the rectangular fabric body of the hammock, 2 to the rods upon which the opposite hemmed ends of the hammock are assembled, and 3 to the spring clips that provide anchorage of the hammock to the opposite side walls of the automobile A, or more particularly to the windowed doors 4 in such side walls. (Only one side wall and one door of the car appear in Fig. I.)

As already mentioned, the body of the hammock consists in a rectangular sheet of canvas, typically 8-ounce duck, 25" in width. An open-ended hem 10 is formed in each end of the sheet, to receive the supporting rods 2, and in this case the overall length of the hemmed sheet is 55", more or less. Advantageously, a plurality of parallel hems 10 are provided in one end of the sheet (the right-hand end in Figs. I and II), in order that the associate rod 2 may be selectively positioned in one or another of the hems, and the effective length of the hammock body adjusted, whereby accommodation may be made for such variation as is found in the internal dimensions (width) of the several makes of cars now in use, or in the depth of the hammock, or both.

The rods 2 are formed of ¼" round steel rod, and the ends of the rods are bent inward, forming U-shaped terminals, in which one leg, 2a, of the U is aligned with the main body of the rod, with the other leg, 2b, spaced laterally therefrom, but parallel thereto. As the rods are assembled with the canvas body of the hammock, the legs 2b of the U-shaped terminals are positioned externally of the hems 10, as shown in Fig. I, and provide exposed or uncovered rod portions that are, by means of the clips 3, anchored to the opposite side walls of the car.

As shown in Fig. IV, each hammock-anchoring clip is formed of a single strap of spring steel of about 3/64" in thickness and 5/8" in width. The body of the clip includes a straight leg 3a and a head 3b; such head 3b is formed in the shape of a shepherd's crook, and is provided with a reversely curved tip 3c; the reversely curved tip forms a socket or seat 3d that is adapted to receive one of the inturned ends 2b of the hammock-supporting rods 2, and, preferably, the body of the clip is continued from the tip 3c in a resilient tongue 3e that assists in bringing such end of the rod to position in the socket, and prevents the rod from becoming accidentally dislodged.

In installing the hammock, the window pane P in each of the opposite side doors of the car is lowered, to move the usual pane-supporting channel C (Fig. III) within the door structure downward from the horizontal sill R of the window—downward through such interval that the channel C will offer no interference with the introduction of the clips 3. When the windows have thus been run down, two clips are installed upon the sill R of each door, and they are installed in the spaced-apart relation illustrated in Fig. I. More specifically, the stem 3a of each clip is inserted and pressed downward between the sill R and the window pane P, and brought to the position illustrated in Fig. III. In such position the sill R is resiliently engaged between the stem 3a and curved head 3b of the clip. When two clips have thus been secured in properly spaced relation on each door, the hammock is mounted in manifest way; that is, the inturned ends of the rods 2, exposed (as at 2b, Fig. I) at the four corners of the hammock, are introduced between the tongues 3e and the shepherd-crook heads 3b of the respective clips, and then pressed downward into position in the rod-engaging seats 3d (Fig. IV) of the clips. Thus, an effective anchorage of the hammock to the opposite doors of the car is provided.

The rod-engaging portions 3c of the clips, though securely anchored to the sills R, provide a yielding support for the hammock; that is, the hammock-engaging tips 3c are adapted to yield laterally under the stress of the hammock in service. This desirable characteristic is gained through the particular shape of the clip, and the resilient material of which it is formed. It will be perceived that the lower end 3f of the flat stem 3a of each clip is bent from the plane of the stem a slight but sufficient angle, to the end that, when once the installation has been made, the window panes may be closed without disturbing the clips. When a window is moved into closed position, the metal channel C on the lower edge of the pane passes, or rides over, the lower edges 3f of the clips.

The portions of the clips that engage the window sills may be covered with a layer L of felt, or of soft rubber, so that the surfaces of the sills will not be scratched or marred. It will be understood from what has been said that the snug, resilient engagement of the clips 3 with the lower rims R of the windows in the opposite doors of the car provides a security of anchorage that is particularly essential for hammocks suspended in traveling vehicles; collectively considered the clips provide an anchorage that is effective to resist the stresses produced by the acceleration, or retardation, or change in direction of travel of the vehicle. And it will be noted (Fig. I) that the U-shaped ends of the rods 2 are adapted laterally to abut upon the rod-receiving tips 3c of the spring clips, with the effect that there can be no disengagement of the rods from the clips when the speed of the car is suddenly accelerated or retarded.

In order that a child will be secure and comfortable in the hammock, it is desirable that the canvas body 1 shall be downwardly bellied. This effect may be gained by gathering the body 1 at its two ends upon the rods 2, and in this case the length of each rod 2 between its U-shaped ends is 18", while the body of the hammock is 24" in width. Additionally, the hem at one end of the hammock body (or at both ends, if desired) may be arched or inclined, as indicated at 10a in Fig. II, with the consequence that the length of the body is greater on its longitudinal center line than at its side edges. Such refinement accentuates the desired pocketed or pouched shape of the hammock. And, of course, cross-ties 7 of rope or tape may be provided as a further safeguard.

It will be perceived in Fig. I that, when the hammock is installed, it is positioned at an interval above the seat 3, and thus it is that persons may occupy the seat while the hammock is in use. When such persons are getting in or out of the car, the hammock is disengaged from the clips at one end and swung aside, and, if it should prove desirable to keep the hammock out of the way for a substantial interval of time, without actually removing it from the car, the ends 2b of the rod at the disengaged end of the hammock may be engaged in the clips that support the hammock at opposite end. That is to say, the rods at both ends of the hammock may be positioned in one and the same pair of clips, in such way that the body of the hammock, transversely folded, hangs loosely upon one door of the car. The tongues 3e on the clips are serviceable in permitting this double engagement of the hammock-supporting rods.

We claim as our invention:

1. An anchorage for securing a child's hammock on a vehicle wall consisting of a strap of spring steel of shepherd's crook shape and including an elongate relatively straight stem, a curved head, and a reversely curved tip, the so-shaped anchorage adapted, by spreading the crook, to receive between said stem and said reversely curved tip the rim of a vehicle wall, and the reversely curved tip of the anchorage adapted to receive and secure the end of a hammock-supporting rod, and to afford a shock-absorbing support for the hammock, the engagement of the anchorage with the rim of the vehicle wall being secure against the effect upon the hammock and its burden of changes in speed and direction of travel of the vehicle.

2. The structure of the next-preceding claim, in which said clips severally include tongues extending upward from their reversely curved tips, substantially as described.

3. An anchorage for securing a child's hammock on a vehicle wall consisting of a strap of spring steel of shepherd's crook shape and including an elongated relatively straight stem having its lower end bent from the plane of its extent and continued at its upper end in a curved head that terminates in a reversely curved tip, the so-shaped anchorage adapted, by spreading the crook, to receive between said stem and said reversely curved tip the rim of a vehicle wall, and the reversely curved tip of the anchorage adapted to receive and secure the end of a hammock-supporting rod, and to afford a shock-absorbing support for the hammock, the engagement of the anchorage with the rim of the vehicle wall being secure against the effect upon the hammock and its burden of changes in speed and direction of travel of the vehicle.

4. In a child's hammock structure including a hammock body formed of an elongate sheet of flexible material hemmed at opposite ends and secured at each end upon a rod, and means for anchoring the rods at the opposite ends of the hammock to the opposite side walls of a vehicle, with the hammock suspended between the walls, the refinement herein described in which said anchoring means consist in a plurality of clips, each formed of a strap of spring steel of shepherd's crook shape and including a substantially straight stem, a curved head, and a reversely curved tip, the so-shaped clip adapted, by spreading the crook, to receive between said stem and said reversely curved tip the rim of one of said side walls, and said reversely curved tip forming a seat for one of the ends of said rods, said clips engaging the ends of said rods, affording a shock-absorbing anchorage for securing the four corners of the hammock to said side walls of the vehicle, the engagement of the clips with the rims of said walls being secure against the effect upon the hammock and its burden of changes in speed and direction of travel of the vehicle.

JOHN SCHUCK.
WALTER W. SCHUCK.